United States Patent [19]

Shiga et al.

[11] 4,195,145

[45] Mar. 25, 1980

[54] PROCESS FOR THE PURIFICATION OF HIGHLY CRYSTALLINE POLYOLEFINS

[75] Inventors: Akinobu Shiga; Kiyoshi Matsuyama; Masahiro Kakugo; Takatoshi Suzuki, all of Niihama, Japan

[73] Assignee: Sumitomo Chemical Company, Limited, Osaka, Japan

[21] Appl. No.: 959,806

[22] Filed: Nov. 13, 1978

[30] Foreign Application Priority Data

Nov. 11, 1977 [JP] Japan .................................. 52/136137

[51] Int. Cl.$^2$ .............................................. C08F 6/28
[52] U.S. Cl. .................................. 526/137; 526/351; 528/483; 528/494
[58] Field of Search .................. 528/483, 494; 526/137

[56] References Cited

U.S. PATENT DOCUMENTS

| | | | |
|---|---|---|---|
| 3,960,765 | 6/1976 | Shiga et al. ........................... | 526/141 |
| 4,053,697 | 10/1977 | Asada et al. ........................... | 528/494 |

Primary Examiner—Stanford M. Levin
Attorney, Agent, or Firm—Sughrue, Rothwell, Mion, Zinn and Macpeak

[57] ABSTRACT

A process for purifying propylene homopolymers or copolymers which comprises:
(i) polymerizing or copolymerizing propylene with other unsaturated hydrocarbon monomers in liquid propylene in the presence of a catalyst system consisting essentially of (a) an activated titanium trichloride obtained by reducing titanium tetrachloride with an organo-aluminum compound followed by activation and (b) an organo-aluminum compound;
(ii) introducing the resulting polymer slurry into an upper portion of a counter-current washing tower to counter-currently contact the polymer slurry with a $C_3$-$C_8$ alcohol and liquid propylene, whereby said catalyst is deactivated and at the same time the propylene homopolymers or copolymers dissolved in the polymer slurry and the catalyst are removed by washing, wherein said alcohol is used in an amount 0.1 to 50 times by mole based on said organo-aluminum compound (b) and is supplied to the washing tower lower than the point of introduction of said polymer slurry, and said liquid propylene is supplied to a lower portion of the washing tower; and
(iii) then after removing volatile monomers by flashing, contacting the powdery propylene homopolymers or copolymers with a gaseous epoxide at a temperature lower than melting point of said polymer or copolymer.

9 Claims, 1 Drawing Figure

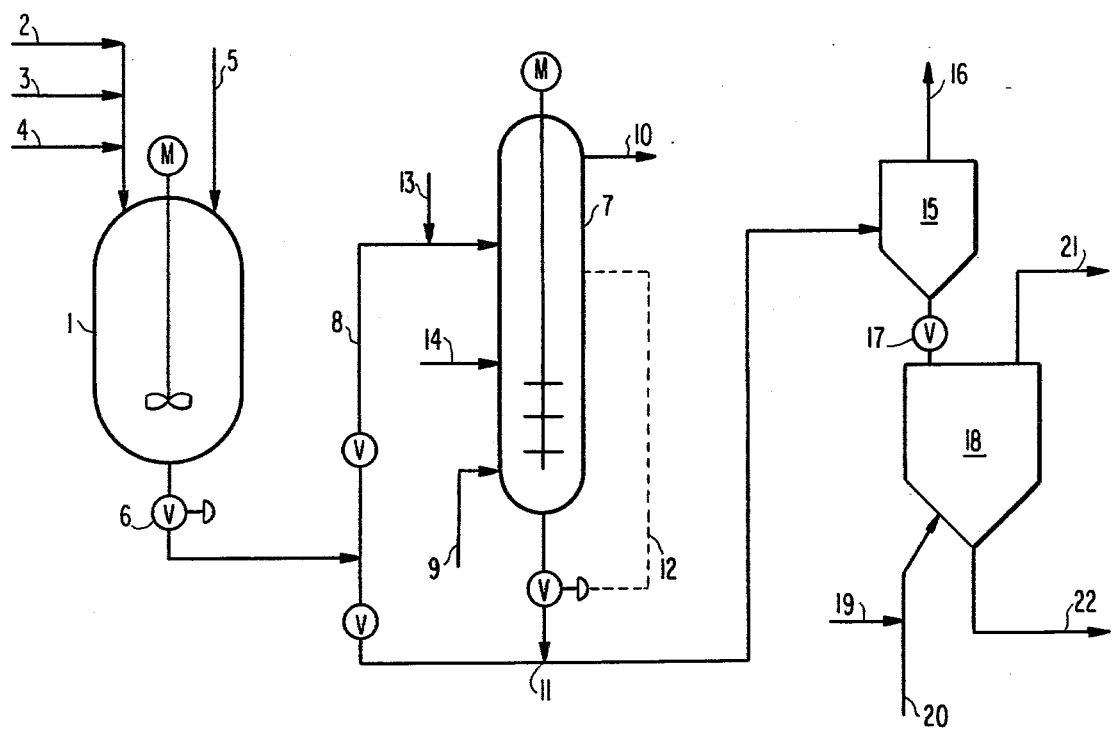

1

PROCESS FOR THE PURIFICATION OF HIGHLY CRYSTALLINE POLYOLEFINS

BACKGROUND OF THE INVENTION

1. Field of the Invention

The present invention relates to a process for purifying propylene homopolymers or copolymers. More particularly, it relates to a process for purifying propylene homopolymers or copolymers which are produced by polymerization or copolymerization of propylene in liquid propylene (hereinafter referred to as "bulk polymerization" for brevity) in an industrially advantageous manner.

2. Discussion of the Prior Art

Bulk polymerization is well-known and has been widely applied in industry. In comparison with the polymer slurry produced by the conventional solvent (or suspension) polymerization (hereinafter referred to as "conventional solvent polymerization") in which polymerization is generally carried out in a liquid saturated hydrocarbon solvent having 5 or more and preferably 5 to 7 carbon atoms, the polymer slurry produced by the bulk polymerization using an unsaturated hydrocarbon monomer (mainly propylene) as a polymerization solvent, is far superior. The polymer is very easily separated from the solvent by merely treating the slurry under reduced pressure because the solvent has such a high vapor pressure and it is easily vaporized.

In general, however, the polymers obtained by bulk polymerization have some disadvantages. First, they generally contain a large amount of polymer soluble in boiling n-heptane. Second, they generally contain a large amount of catalyst residue. Accordingly, they have inferior physical properties as described below in more detail.

The polymer produced, for example, using a catalyst system of titanium trichloride and triethylaluminum contains boiling n-heptane-insoluble polymer in an amount of only 75 to 85%, and, in the case of a titanium trichloride and diethylaluminum chloride catalyst system, the amount of boiling n-heptane-insoluble polymer is 85 to 95%. Polymers containing boiling n-heptane-soluble polymer in large amounts have inferior physical properties, particularly stiffness and tackiness. Such polymers can be used as a moulding grade polymers, but they cannot be used as a film and fiber grade polymers requiring relatively high level physical properties.

Turning to the catalyst residues, reducing the catalyst residues is possible in itself in a bulk polymerization because the polymerization has a high polymerization rate in comparison to the conventional solvent polymerization and in addition it can be operated at a high catalyst efficiency. However, the fact is the polymer produced by this process is inferior in thermal stability and color and as a result it cannot be used as a high grade polymer.

Previously, the inventors attempted to raise the quality of such polymers as follows.

In the case of the polymer slurry produced by bulk polymerization, polymers soluble in the slurry, catalysts dissolved in the slurry among those remaining in the slurry and a part of catalysts deposited from the slurry can easily be separated from the slurry in the counter-current washing tower using liquid propylene as a washing solvent. As a result, a process was discovered for producing propylene homopolymers and copolymers in an industrially advantageous manner (Japanese Patent Application (OPI) Nos. 79589/1975, 102681/1975, 139886/1976 and 3679/1977 and U.S. Pat. No. 4,053,697.

With this process, however, there is a possibility of problems occurring when extremely higher levels of quality than commercially required at the present time are desired. In the above process, for example, additives such as a stabilizer and a lubricating agent are easily decomposed by the action of catalyst residues in the polymer, particularly chlorine components and therefore the use of large amounts of additives is necessary.

It is also well known that the epoxides used for stabilizing the catalyst residues deactivate the chlorine components, and in the case of the bulk polymerization of propylene, various purification processes using epoxides have been proposed. For example, Japanese Patent Publication Nos. 29946/1975 and 1274/1976 propose a process which comprises treating the polymer slurry by the direct addition of an epoxide and an alcohol thereto, followed by washing with a lower hydrocarbon. Every one of these processes, however, is not considered favorable, because the deactivation treatment is carried out in a system containing all of the titanium compound and an organo-aluminum compound used in the polymerization so that more treating agent is required. Further, when cheap, low-boiling propylene oxide is used as the epoxide, the separation of propylene from epoxide is so difficult that a rectifying tower of very high separation efficiency is required to purify the unreacted propylene for recycling to the polymerization step.

On the other hand, Japanese Patent Application (OPI) No. 139883/1975 discloses another process which comprises contacting a catalyst residue containing a polyolefin with a mixed vapor of an alkylene oxide and water and thereby purifying the polyolefin. This process is superior in removing the halogen components from the catalyst residues, but it is not considered favorable due to serious problems such as the corrosion of equipment owing to the hydrogen halide and moisture contained in the system.

SUMMARY OF THE INVENTION

One object of the present invention is to provide an improved process for further improving the quality of product in comparison to the various processes described above. The inventors extensively studied this subject from various viewpoints and found that the halogen components in the catalyst residues can be deactivated and removed by a very superior process.

The present invention provides a process for purifying propylene homopolymers or copolymers which comprises:

(i) polymerizing or copolymerizing propylene with other unsaturated hydrocarbon monomers in liquid propylene in the presence of a catalyst system consisting essentially of (a) an activated titanium trichloride obtained by reducing titanium tetrachloride with an organo-aluminum compound followed by activation and (b) an organo-aluminum compound;

(ii) introducing the resulting polymer slurry into an upper portion of a counter-current washing tower to counter-currently contact the polymer slurry with a $C_3$–$C_8$ alcohol in an amount of 0.1 to 50 times by mole based on said organo-aluminum compound (b) supplied to a portion of the washing tower and liquid propylene supplied to a lower portion of the washing tower, whereby said catalyst is deactivated and at the same time propylene homopolymers or copolymers dissolved in the polymer slurry and the catalyst are removed by washing; and (iii) then after removing the volatile monomers by flashing, contacting the powdery propylene homopolymers or copolymers with a gaseous epoxide at a temperature lower than melting point thereof.

By practicing the present invention, there can be obtained effects which are superior to the well-known processes in the following regards:

(1) Since polymers and organo-aluminum components soluble in liquid propylene are substantially separated and removed in the washing tower, very high-quality solid polymers having very little ash content and a low amorphous polymer content are obtained.

(2) Since the organo-aluminum components soluble in liquid propylene are substantially removed in the washing tower, the solid polymers contain little chlorine originating from the organo-aluminum components. Besides, on account of the treatment with an alcohol in the tower, chlorine originating from the titanium components readily reacts with the epoxide. Consequently, the amount of epoxide and the time of the epoxide-treatment step can be greatly decreased.

(3) The chlorine component in catalyst residue which decomposes additives such as a stabilizer and a lubricating agent to weaken effects thereof can almost be removed from the polymer by the treatment with epoxide, and therefore the amount of additives can be decreased to a large extent.

(4) The product is superior in thermal stability and color, and can be used as a film and fiber grade polymer requiring high levels of quality.

(5) A large scale drier is not necessary because the treatment with epoxide is carried out in a gaseous phase.

BRIEF DESCRIPTION OF THE DRAWING

The FIGURE is a schematic diagram illustrating a process of the present invention.

DETAILED DESCRIPTION OF THE INVENTION

In order that the residual catalyst in the polymer product be little enough not to exert adverse effects on the polymer as final product, it is desirable to carry out the polymerization at a high catalyst efficiency, that is, at an efficiency of more than 8,000 g of product per gram of solid catalyst.

A preferred titanium compound used as catalyst in the present invention is one having a high activity and a narrow particle size distribution. For example, highly activated solid catalysts produced as follows are suitable. Titanium trichloride, a starting material, is produced by reduction of titanium tetrachloride with an organo-aluminum compound. The titanium trichloride is then treated with a complexing agent, organo-aluminum compound, iodine-complexing agent, titanium tetrachloride, or combinations thereof.

More particularly, for example, the solid catalyst systems disclosed in Japanese Patent Application (OPI) Nos. 146587/1976 and 97685/1976, U.S. Pat. No. 3,960,765, British Pat. No. 1,391,067 and U.S. application Ser. Nos. 831,630, 881,314 and 885,249, may be used. The catalyst system used in the present invention contains both the foregoing activated titanium compound and an organo-aluminum compound, and it may contain well-known third components such as amines, ethers, esters, derivatives of sulfur, halogen, benzene or azulene, organic or inorganic nitrogen compounds or organic or inorganic phosphorus compounds. Generally, the titanium compound and the organo-aluminum compound are present in a ratio of 10:1 to 1:500 (titanium trichloride to organo-aluminum compound), preferably 2:1 to 1:200 and most preferably 1:1 to 1:100.

The alcohol used in the present invention includes aliphatic alcohols or alicyclic alcohols having 3 to 8 carbon atoms and preferably saturated, for example, n-propanol, isopropanol isobutanol, n-butanol, sec-butanol, tert-butanol, m-amyl alcohol, sec-amyl alcohol, cyclopentanol, n-hexanol, 1-methyl-pentanol, 2-methylpentanol, 1-ethylbutanol, cyclohexanol, 2-methylcyclopentanol, n-heptanol, 2-methylcyclohexanol, 2-methylhexanol, n-octanol, 2-ethylhexanol and the like. Particularly, alcohols having a hydrocarbon group linked to the carbon atom at $\alpha$- or $\beta$-position relative to the hydroxyl group are superior in terms of an ability to wash off the catalyst from the polymer. In this respect, isopropanol, isobutanol, sec-butanol, sec-amyl alcohol, cyclohexanol and 2-ethylhexanol are preferably used.

The amount of alcohol used depends upon the amount of organo-aluminum compound in the polymer slurry. When the amount is small, high molecular weight polymers which lower the properties of polymer to a large extent are produced in the washing tower. When the alcohol is used in a large excess, it is adsorbed into the polymer in large amounts and is difficult to remove by counter-current washing with liquid propylene. Besides, free hydrogen chloride is evolved causing the corrosion of equipments. Accordingly, the amount of alcohol used is 0.1 to 50 times by mole, preferably 0.1 to 10 times by mole, and most preferably 0.5 to 5 times by mole, based on the organo-aluminum compound.

The alcohol is supplied to the washing tower directly or after dilution with liquid propylene. Alternatively, it may be supplied to a feed line for the polymer slurry or to liquid propylene used as a washing liquor.

As the gaseous epoxide used for the contact-treatment of the powdery polymer, there may be used alkylene oxides and glycidyl ethers generally having 2 to 8 carbon atoms such as ethylene oxide, propylene oxide, butylene oxide, epichlorohydrin, methyl glycidyl ether, ethyl glycidyl ether, butyl glycidyl ether and the like. Particularly preferred epoxides are low-boiling epoxides such as propylene oxide and ethylene oxide. The amount of epoxide used is usually 0.5 to 10 times by mole, preferably 1 to 5 times by mole, based on the chlorine content contained in the polymer.

The FIGURE illustrates one example of the processes of the present invention. The process of the present invention will now be discussed with reference to FIG. 1.

Liquid propylene is supplied to a polymerization reactor 1 through a line 2. An unsaturated hydrocarbon monomer such as ethylene, a molecular weight regulating agent, such as hydrogen; and a catalyst (a solid catalyst and an organo-aluminum compound) are supplied to the reactor 1 through lines 3, 4 and 5, respectively.

Preferably, the polymerization is carried out at 30° to 100° C. and under a pressure at which propylene is kept liquid. The produced polymer slurry is withdrawn, batchwise preferably continuously, from the reactor 1 through a valve 6 and supplied to the top 8 of a counter-current washing tower 7 (hereinafter referred to as "top feed" for brevity). Liquid propylene, preferably fresh propylene without slurry-soluble polymers (mainly amorphous polymer), is supplied to the lower portion of the tower 7 through a line 9 (hereinafter referred to as "bottom feed" for brevity).

The alcohol is supplied, directly or after dilution with liquid propylene, to the tower through a line 9, 13 or 14. Supplying the alcohol through the line 14 is most preferred to intimately contact the alcohol with the polymer thereby enhancing the washing effect. Slurry-soluble polymers and reaction products between the residual catalyst in the polymer slurry and the alcohol are selectively withdrawn through an overflow line 10 and introduced into recovery equipment for amorphous polymers. In the tower 7, the polymer slurry is brought into a counter-current contact with the liquid propylene of the bottom feed, and the slurry-insoluble polymer is selectively withdrawn from the bottom of the tower. The deposited slurry at the bottom of the tower is reduced to nearly atmospheric pressure by a valve 12 which is interlocked with a level (or concentration) controller LC (not shown) and introduced into a flash tank 15 through a line 11.

The monomers consisting essentially of liquid propylene which are volatile under atmospheric pressure are vaporized in the flash tank 15 and sent to a purification step through a line 16.

The polymer separated in the flash tank 15 is sent to an epoxide-treatment vessel 18 through a valve 17. To the vessel 18 are supplied a gaseous epoxide and nitrogen gas through lines 19 and 20, respectively. The treating temperature is within the range of room temperature (about 20° C.) to less than the melting point of the polymer, preferably 40° to 120° C. A treating time of 5 to 30 minutes is sufficient. The treatment vessel 18 is preferably of the fluid bed-type, but commonly used ventilation-type driers or hoppers constructed such that a gas can be supplied to the bottom can also be used satisfactorily.

The reaction gas containing unreacted epoxide is withdrawn through a line 21 and, if necessary, thereafter purified, is recycled to the treatment vessel 18.

The polymer treated in the vessel 18 is sent to a granulator through a line 22, after dried (before granulation), if necessary, and finished into a final product thereat.

The process of the present invention will be illustrated more clearly with reference to the following examples and comparative examples, which are, however, not to be interpreted as limiting the invention.

EXAMPLE 1

(1) Preparation of Catalyst

Preparation I (preparation of reduction product)

After the atmosphere in a 200-liter reactor was replaced with argon, 40 liters of dry hexane and 10 liters of titanium tetrachloride were added thereto, and the mixed solution was maintained at −5° C. A mixed solution of 30 liters of dry hexane and 23.2 liters of ethylaluminum sesquichloride was added dropwise thereto while maintaining the temperature of the reaction system at −3° C. or less. The reaction system was continuously stirred for 2 hours at the same temperature. After the reaction was completed and the system was allowed to stand, the reaction product was separated from the liquid portion at 0° C. and washed twice with hexane (40 liters).

Thus, 16 kg of a reduction product was obtained.

Preparation II

The reduction product obtained in Preparation I was slurried in n-decalin, and the slurry concentration was adjusted to 0.2 g/cc, followed by heat treatment at 140° C. for 2 hours. After the reaction was finished, the supernatant liquid was discharged and the product was washed twice with 40 liters of hexane to obtain a titanium trichloride composition (A).

Preparation III 11 kg of the titanium trichloride composition (A) prepared in Preparation II was slurried in 55 liters of toluene. Iodine and di-n-butyl ether were added thereto so that the molar ratio of titanium trichloride composition (A) to $I_2$ to di-n-butyl ether was 1:0.1:0.1. The reaction was carried out at 80° C. for 1 hour to obtain a titanium trichloride solid catalyst (B).

(2) Polymerization of Propylene and Purification of Produced Polymer 1,700 kg/hr of liquid propylene, 60 g/hr of the foregoing solid catalyst (B) and 600 g/hr of diethylaluminum chloride were continuously supplied to a 30 m³ polymerization reactor in the presence of hydrogen, and propylene was polymerized at 70° C. During that time, the pressure in the reactor was 31 to 31.8 kg/cm²G, and the polymer slurry produced was withdrawn from the bottom of the reactor so that the level in the reactor was kept constant.

The polymer slurry withdrawn under this condition comprised 900 kg/hr of solid propylene polymer, 12 kg/hr of the so-called atactic polymer soluble in liquid propylene as by-product and 788 kg/hr of unreacted liquid propylene containing most of the aluminum compound supplied.

This polymer slurry was continuously withdrawn from the bottom of the reactor and supplied to the top 8 of the counter-current multistage washing tower 7 (all references are to FIG. 1).

370 g/hr of isobutanol as a deactivator was supplied under pressure to the middle portion 14 of the washing tower.

On the other hand, 1,100 kg/hr of purified liquid propylene maintained at 61° to 64° C. was continuously supplied to the bottom 9 of the tower. Agitation in the tower was carried out at a very slow rate of 12 rpm. During this operation, the pressure in the tower was 26.1 to 27.0 kg/cm²G. As the polymer deposited at the bottom, it was continuously sent to a flash tank 15 through a reducing valve 12 interlocked with a level controller LC and a line 11.

From the top 10 of the tower was withdrawn 1,500 kg/hr of liquid propylene containing the aluminum component of the catalyst and 12 kg/hr of atactic polymer, which was introduced into recovery equipment for the atactic polymer. The loss of fine powdery solid polymer contained therein was 1% or less. The slurry withdrawn from the bottom of the tower was separated in the flash tank 15, and a powdery polymer was obtained from the bottom.

This polymer was supplied to an epoxide-treatment vessel 18 and treated at 60° C. while supplying 1,500 liter/hr nitrogen and 90 g/hr propylene oxide through lines 20 and 19, respectively. The powdery polymer was withdrawn through a line 22, and after placing the polymer on an iron plate (SS carbon steel), it was pressed against the plate at 190° C. After separating the polymer from the iron plate, the plate was allowed to stand for 24 hours and the degree of corrosion on the iron surface was examined.

Further, this powdery polymer and 2,6-di-tert-butyl-4-methylphenol (BHT) as an antioxidant in an amount of 0.2 g per 100 g of the powdery polymer were mixed and pelletized at 200° C. using an extruder. Polymer characteristics such as the color of pellet, chlorine content by fluorescent X-ray analysis and thermal stability were examined and tabulated in Table 1 together with the results of the comparative examples and examples described hereinafter.

Film characteristics such as blocking of a film of 30μ thick (produced using a 40 mm φ T-die) were also shown in Table 1.

The thermal stability test was carried out by keeping a press sheet of 1 mm in thickness in a gear oven of 150° C. and examining a term required for thermal degradation. The result of the test was shown in the number of days (referred to as "G.O. Life" for brevity).

The following results are clearly shown in the table: The solid catalyst in Example 1 shows a high catalyst efficiency, the amount of polymerization per unit weight of solid catalyst is extremely high, about 15,000 g/g. Consequently, the purification process after polymerization is simplified, and the ash content of the polymer produced according to the present invention is equal to that of polymers obtained by the conventional complicated purification processes.

Isotactic index (II%) of the polymer product is as high as 98.5%. Moreover, in the extraction test using liquid propylene of 65° C. in autoclave, extracted residues are substantially zero. It was thus found that washing is substantially complete in the washing tower.

It was further found from the ash and corrosion tests that the chlorine component in the polymer is almost completely deactivated and removed by the epoxide-treatment.

The qualities of films obtained from this polymer were also superior to those commercially available.

The specifications of the counter-current washing tower used in Example 1 were as follows:
Diameter of tower: 600 mm φ
Height of tower: 8,200 mm
Rotating axis: Ten blades attached in the axial direction Epoxide-treatment vessel:
Diameter of vessel: 800 mm φ
Height of vessel: 2,000 mm
Rotating axis: Three blades attached in the axial direction

COMPARATIVE EXAMPLE 1

The procedure was carried out in the same manner as in Example 1 except that washing was carried out without supplying the deactivator such as isopropanol. The results are shown in Table 1.

In comparison with the polymer in Example 1, the ash content is high and the removal of chlorine components is poor. The film produced has a too poor haze and too many fish eyes for commercial use.

COMPARATIVE EXAMPLE 2

The procedure was carried out in the same manner as in Example 1 except that a commercial titanium trichloride (TiCl₃ AA produced by Toyo Stauffer Co.) was used in place of the solid catalyst prepared in Example 1. The results are shown in Table 1. In this case, remaining ash, film characteristics and G.O. Life are all inferior, to say nothing of the catalyst efficiency, as compared with the case wherein the solid catalyst is used.

COMPARATIVE EXAMPLE 3

The procedure was carried out in the same manner as in Example 1 except that the epoxide-treatment was omitted.

Although polymer characteristics such as ash content were hardly different from those in Example 1, the complete deactivation of chlorine components was not achieved so that it was necessary to use a neutralizing agent such as calcium stearate as additives.

EXAMPLES 2 TO 6

The procedures were carried out in the same manner as in Example 1 except that the deactivators shown in Table 1 were used in place of isobutanol and that the epoxides shown in Table 1 were used in the epoxide-treatment in place of propylene oxide.

The results of polymerization and film characteristics are shown in Table 1, and they showed substantially the same good results as in Example 1.

TABLE 1

| | Characteristic Properties of Polymer | | | | | |
|---|---|---|---|---|---|---|
| | Example 1 | Example 2 | Example 3 | Example 4 | Example 5 | Example 6 |
| Catalyst | | | | | | |
| Titanium Component | Solid Catalyst B | Solid Catalyst B | Solid Catalyst B | Solid Catalyst B | Solid Catalyst B | Solid Catalyst B |
| Flow Rate of Titanium Component (g/hr) | 40 | 40 | 40 | 40 | 40 | 40 |
| Flow Rate of Aluminium Component (g/hr) | 600 | 600 | 600 | 600 | 600 | 600 |
| Washing | | | | | | |
| Deactivator | Isobutanol | Isobutanol | Cyclohexanol | 2-Ethylhexanol | Isopropanol | Isopropanol |
| Flow Rate of Deactivator (g/hr) | 370 | 370 | 200 | 400 | 200 | 200 |
| Epoxide Treatment | | | | | | |
| Treating Time (min) | 20 | 20 | 20 | 20 | 20 | 20 |
| Treating Temperature (°C.) | 60 | 60 | 60 | 60 | 60 | 100 |
| Epoxide | Propylene Oxide | Butylene Oxide | Propylene Oxide | Ethylene Oxide | Propylene Oxide | Propylene Oxide |
| Flow Rate of Epoxide (g/hr) | 90 | 150 | 90 | 60 | 90 | 90 |
| Polymer Characteristics | | | | | | |
| II (%) | 98.5 | 99.0 | 99.2 | 98.5 | 98.6 | 98.6 |
| Ash TiO₂ (ppm) | 20 | 20 | 15 | 13 | 23 | 20 |

TABLE 1-continued

| Characteristic Properties of Polymer | | | | | | |
|---|---|---|---|---|---|---|
| Al$_2$O$_3$ (ppm) | 15 | 12 | 18 | 12 | 10 | 12 |
| Cl (ppm) | 8 | 6 | 10 | 8 | 6 | 2 |
| Color of Pellet | Good | Good | Good | Good | Good | Good |
| Corrosion Test | None | None | None | None | None | None |
| G.O. Life (day) | 92 | 85 | 88 | 90 | 91 | 95 |
| Film Characteristics | | | | | | |
| Blocking (g/100 cm$^2$) | 12 | 15 | 13 | 13 | 15 | 14 |
| Young's Modulus (kg/cm$^2$) | 7800 | 7650 | 7600 | 7700 | 7200 | 7800 |
| Foaming | None | None | None | None | None | None |
| Fish Eye | None | None | None | None | None | None |

| | Comparative Example 1 | Comparative Example 2 | Comparative Example 3 |
|---|---|---|---|
| Catalyst | | | |
| Titanium Component | Solid Catalyst B | TiCl$_3$ AA | Solid Catalyst B |
| Flow Rate of Titanium Component (g/hr) | 40 | 180 | 40 |
| Flow Rate of Aluminum | 600 | 600 | 600 |
| Washing | | | |
| Deactivator | None | Isobutanol | Isobutanol |
| Flow Rate of Deactivator (g/hr) | | 370 | 370 |
| Epoxide Treatment | | | |
| Treating Time (min) | 20 | 20 | 20 |
| Treating Temperature (°C.) | 60 | 60 | 60 |
| Epoxide | Propylene Oxide | Propylene Oxide | None |
| Flow Rate of Epoxide (g/hr) | 90 | 90 | |
| Polymer Characteristics | | | |
| II (%) | 98.4 | 92 | 98.5 |
| Ash TiOhd 2 (ppm) | 40 | 132 | 22 |
| Al$_2$O$_3$ (ppm) | 44 | 23 | 13 |
| Cl (ppm) | 33 | 110 | 45 |
| Color of Pellet | Good | Yellowing | Good |
| Corrosion Test | None | Slightly Observed | Observed |
| G.O. Life (day) | 44 | 12 | 55 |
| Film Characteristics | | | |
| Blocking (g/100 cm$^2$) | 15 | 44 | 12 |
| Young's Modulus (kg/cm$^2$) | 7700 | 5900 | 7200 |
| Foaming | None | Observed | None |
| Fish Eye | Many | Many | None |

While the invention has been described in detail and with reference to specific embodiments thereof, it will be apparent to one skilled in the art that various changes and modifications can be made therein without departing from the spirit and scope thereof.

What is claimed is:

1. A process for the purification of propylene homopolymers or copolymers which comprises:
   (i) polymerizing propylene or copolymerizing propylene with other unsaturated hydrocarbon monomers in liquid propylene in the presence of a catalyst system consisting essentially of (a) an activated titanium trichloride obtained by reducing titanium tetrachloride with an organo-aluminum compound followed by activation and (b) an organo-aluminum compound;
   (ii) introducing the resulting polymer slurry into the upper portion of a counter-current washing tower to counter-currently contact the polymer slurry with a C$_3$-C$_8$ alcohol and liquid propylene, whereby said catalyst is deactivated and at the same time the propylene homopolymers or copolymers dissolved in the polymer slurry and the catalyst are removed by washing, wherein said alcohol is used in an amount 0.1 to 50 times by mole based on said organo-aluminum compound (b) and is supplied to the washing tower and wherein said liquid propylene is supplied to the lower portion of the washing tower; and
   (iii) then after removing volatile monomers by flashing, contacting the powdery propylene homopolymers or copolymers with a gaseous epoxide at a temperature lower than melting point of said homopolymer or copolymer.

2. The process according to claim 1, wherein said C$_3$-C$_8$ alcohol has a hydrocarbon group bonded to the carbon atom at at least the α- or β-position.

3. The process according to claim 2, wherein the C$_3$-C$_8$ alcohol is isopropanol, isobutanol, sec-butanol, sec-amyl alcohol, cyclohexanol or 2-ethyl hexanol.

4. The process according to claim 1, wherein the amount of said C$_3$-C$_8$ alcohol is 0.1 to 10 times by mole based on the amount of said organo-aluminum compound.

5. The process according to claim 4, wherein the amount of said C$_3$-C$_8$ alcohol is 0.5 to 5 times by mole based on the amount of said organo-aluminum compound.

6. The process according to claim 1, wherein said epoxide is a member selected from the group consisting of ethylene oxide, propylene oxide, butylene oxide, epichlorohydrin, methyl glycidyl ether, ethyl glycidyl ether and butyl glycidyl ether.

7. The process according to claim 1, wherein the amount of said epoxide is 0.5 to 10 times by mole based on the chlorine content contained in said powdery propylene homopolymer or copolymer.

8. The process according to claim 7, wherein the amount of the epoxide is 1 to 5 times by mole based on the chlorine content contained in said powdery propylene homopolymer or copolymer.

9. The process according to claim 1, wherein said contact is carried out at temperature of 40° to 120° C.

* * * * *